J. G. CROSS.
Milk and Cheese Rack.
No. 56,722.
Patented July 31, 1866.
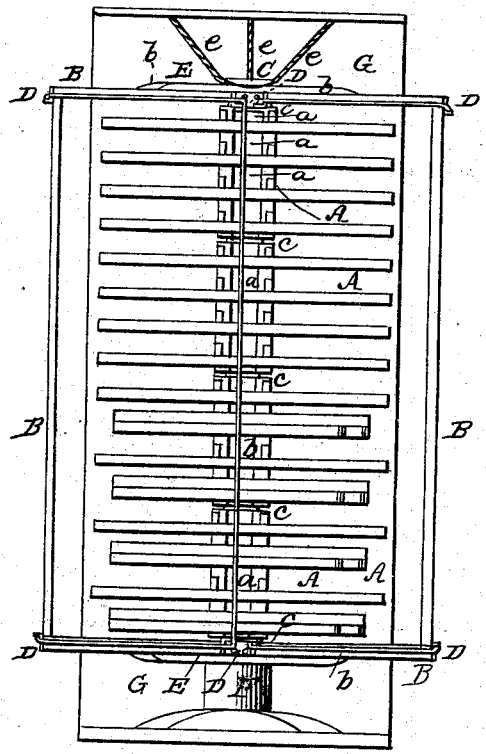
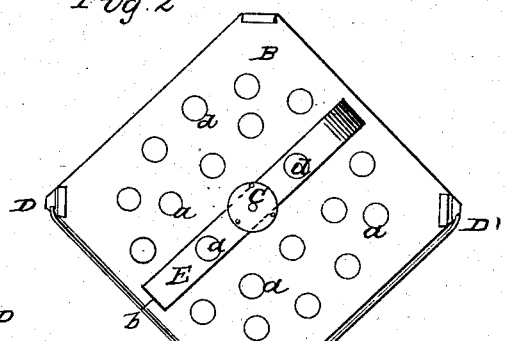
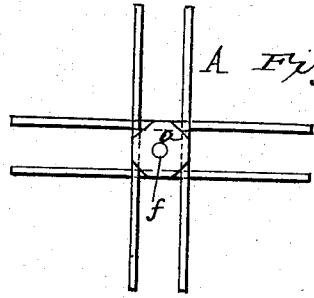
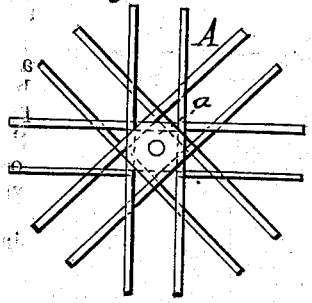
Witnesses
P. W. Clarke
Geo. Howe
Inventor
John G. Cross

UNITED STATES PATENT OFFICE.

JOHN G. CROSS, OF BRATTLEBOROUGH, VERMONT.

IMPROVEMENT IN MILK AND CHEESE RACKS.

Specification forming part of Letters Patent No. 56,722, dated July 31, 1866.

*To all whom it may concern:*

Be it known that I, JOHN G. CROSS, of Brattleborough, in the county of Windham and State of Vermont, have invented a new and Improved Milk and Cheese Rack; and I do hereby declare that the following is a full and exact description thereof, reference being had to the accompanying drawings, and to the letters of reference marked thereon.

My invention consists in providing an octagonal or rectangular rack in sections, revolving on a perpendicular shaft, the shaft inserted in a movable rectangular base, the whole inclosed with a screen attached to a frame perforated with holes for the free circulation of air.

I fasten each pair of slats, at right angles with another pair, to a nave which revolves upon the perpendicular shaft. Four, eight, twelve, or more slats, as desired, and to suit the size of the dairy, may be attached to one nave, making the nave long or short to suit the number of slats.

The great advantage of making the rack in sections is that each meal of milk can be set separately in the rack. Thus the pans of milk can be set in one section or removed therefrom without disturbing or moving the other sections or the milk on another section in which the cream is in process of forming.

The slats can be attached to the nave in an octagonal or rectangular form, as desired. The accompanying drawings show both forms.

The screen-frame can be square or round, to revolve upon the shaft, or stationary, as desired, the screen made to open like a door or to slide upon wires. The drawings show both ways.

The whole structure of racks is made to hold seventy-six pans, each separate, in the space of four feet square by eight feet in height. One six feet in diameter, same height, will hold one hundred and fifty-two pans.

Being made in sections, the rack can easily be moved from one room to another as the season and weather change.

In the accompanying drawings, Figure 1 is a vertical projection of the rack and screen-frame with screen removed. Fig. 2 is a horizontal projection of the top of the screen-frame, the bottom similar; Fig. 3, a horizontal projection of rectangular form of arms, showing the method of fastening the same. Fig. 4 is a horizontal projection of octagonal form of arms, showing method of fastening.

Similar letters refer to like parts in the different figures.

A A are slats; B B, screen-frame; C, a brass button, to which cords are attached to fasten the rack to the ceiling of the room, if desired; D, the hooks securing the screen; E E, pieces to strengthen the top and bottom of screen-frame; F, socket for shaft; G, wall of the room; *a a*, naves; *b b*, wire to which screen is attached; *c c*, washers between sections of rack; *d d*, air-holes in top and bottom of screen-frame; *e e*, cords to steady rack; *f f*, shaft.

What I claim as my invention, and desire to secure by Letters Patent, is—

The revolving rack in sections and the manner of inclosing rack in screen, with ventilators at top and bottom.

JOHN G. CROSS.

Witnesses:
GEO. A. HUNT,
G. H. MANN.